Feb. 20, 1962    F. A. LYON ETAL    3,021,874
COIL WINDING MEANS
Filed June 25, 1958    6 Sheets-Sheet 1

INVENTORS
FLOYD A. LYON
THEODORE F. ARONSON
BY
ATTORNEY.

Feb. 20, 1962   F. A. LYON ETAL   3,021,874
COIL WINDING MEANS
Filed June 25, 1958   6 Sheets-Sheet 2
FIG. IA
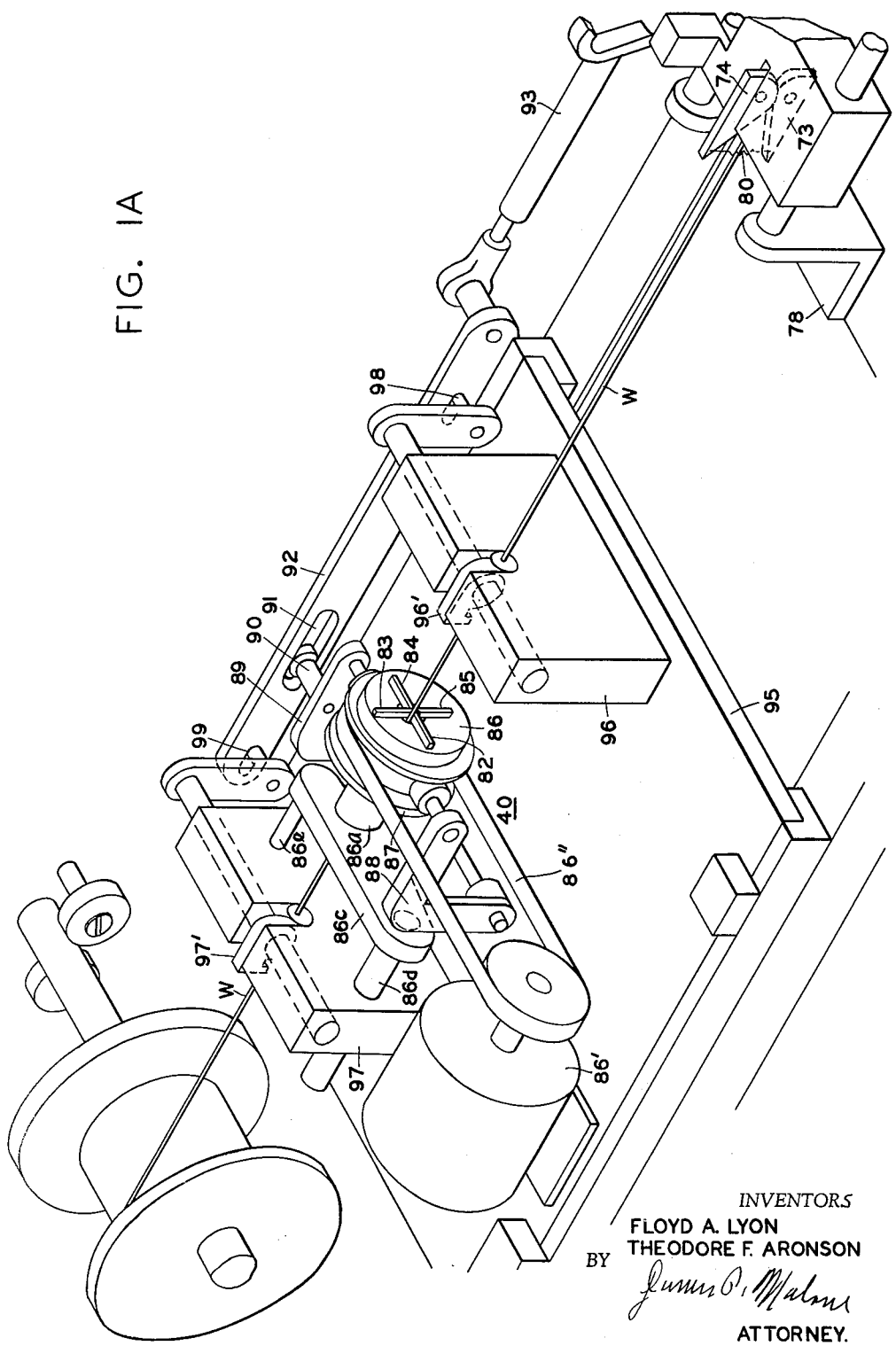
INVENTORS
FLOYD A. LYON
THEODORE F. ARONSON
BY
*James P. Malone*
ATTORNEY.

Feb. 20, 1962  F. A. LYON ETAL  3,021,874
COIL WINDING MEANS

Filed June 25, 1958  6 Sheets-Sheet 3

FIG. IB

INVENTORS
FLOYD A. LYON
THEODORE F. ARONSON
BY
ATTORNEY.

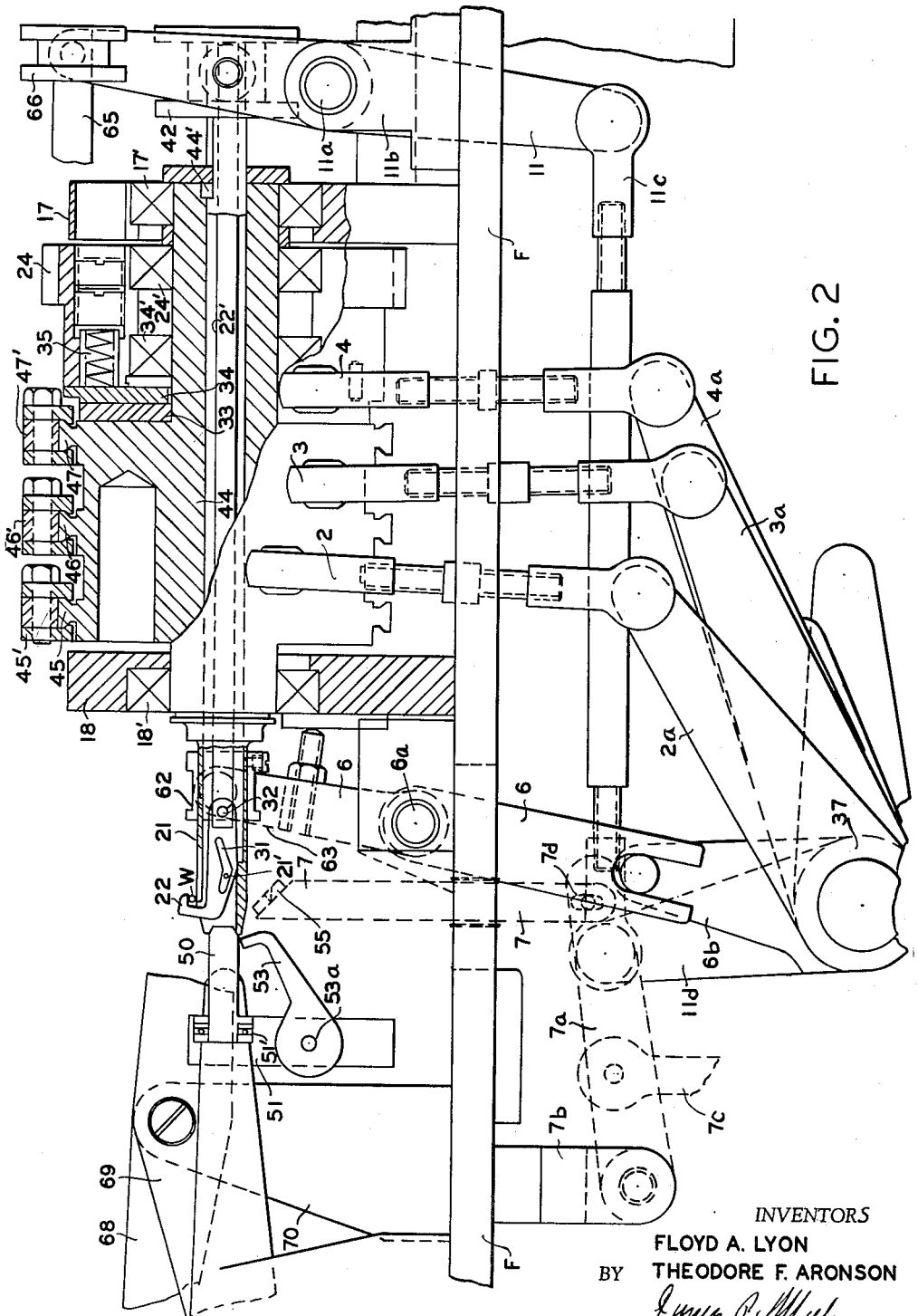

Feb. 20, 1962  F. A. LYON ETAL  3,021,874
COIL WINDING MEANS

Filed June 25, 1958  6 Sheets-Sheet 5

INVENTORS
FLOYD A. LYON
THEODORE F. ARONSON
BY
*James P. Malone*
ATTORNEY.

United States Patent Office 3,021,874
Patented Feb. 20, 1962

3,021,874
COIL WINDING MEANS
Floyd A. Lyon, Brookville, and Theodore F. Aronson, Glen Cove, N.Y., assignors to Hahn Instrument Co., Inc., Glen Head, N.Y., a corporation of New York
Filed June 25, 1958, Ser. No. 744,599
3 Claims. (Cl. 140—92.2)

This invention relates to coil winding means for electrical coils and more particularly to such means for winding two continuous coils and bending them in parallel relation.

More particularly the invention relates to means for winding two coils of relatively heavy wire and then bending the coils in a predetermined relation, for instance, parallel to each other.

Such coils are commonly used in conventional voltage regulators in automobiles. Heretofore, these coils had to be wound by hand, or wound separately and then welded together. This welding operation is difficult to perform without affecting the desired space relation of the coils, since they must fit into a molded case and operate contacts mounted in the case.

The invention generally comprises wire feeding means, insulation stripping means, and coil winding means comprising a first driven mandrel for winding a first coil. The mandrel has a cam operated finger clamp connected to grip the end of the wire. The mandrel has a spring loaded collar and a variable stop for forcing the wire to wind back over the first coil layer. A second mandrel is rotatably mounted and cam driven at the proper time into coaxial relation with the first mandrel so that the wire continues from the first mandrel onto the second mandrel to wind a second coil continuous with the first coil. The wire is then cut in the area where the insulation has been previously stripped to provide both ends free of insulation, and the coils are bent into a predetermined space relation. All of the operations are cam controlled and various stops are provided to synchronize the movements of the wire.

Accordingly, a principal object of the invention is to provide new and improved coil winding means.

Another object of the invention is to provide new and improved coil winding means for providing two continuous coils in predetermined space relation.

Another object of the invention is to provide new and improved mandrel means for coil winding.

Another object of the invention is to provide new and improved wire clamping means for mandrels in coil winding apparatus.

Another object of the invention is to provide new and improved insulation stripping means for wire, said stripping means being located at a predetermined distance from the cutting means for cutting the end of the coil.

Another object of the invention is to provide dual mandrel means for coil winding for providing two continuous coils in parallel space relation.

Another object of the invention is to provide new and improved control means for coil winding machines.

Another object of the invention is to provide first mandrel means and second mandrel means rotatably mounted and adapted to be moved from coaxial relation with said first mandrel means to parallel relation with said first mandrel means.

These and other objects of the invention will become apparent from the following specification and drawings, of which:

FIGURES 1, 1A and 1B are perspective views of an embodiment of the invention.

FIGURE 2 is an elevation view partly in section generally along the main axis of rotation.

Figure 1:
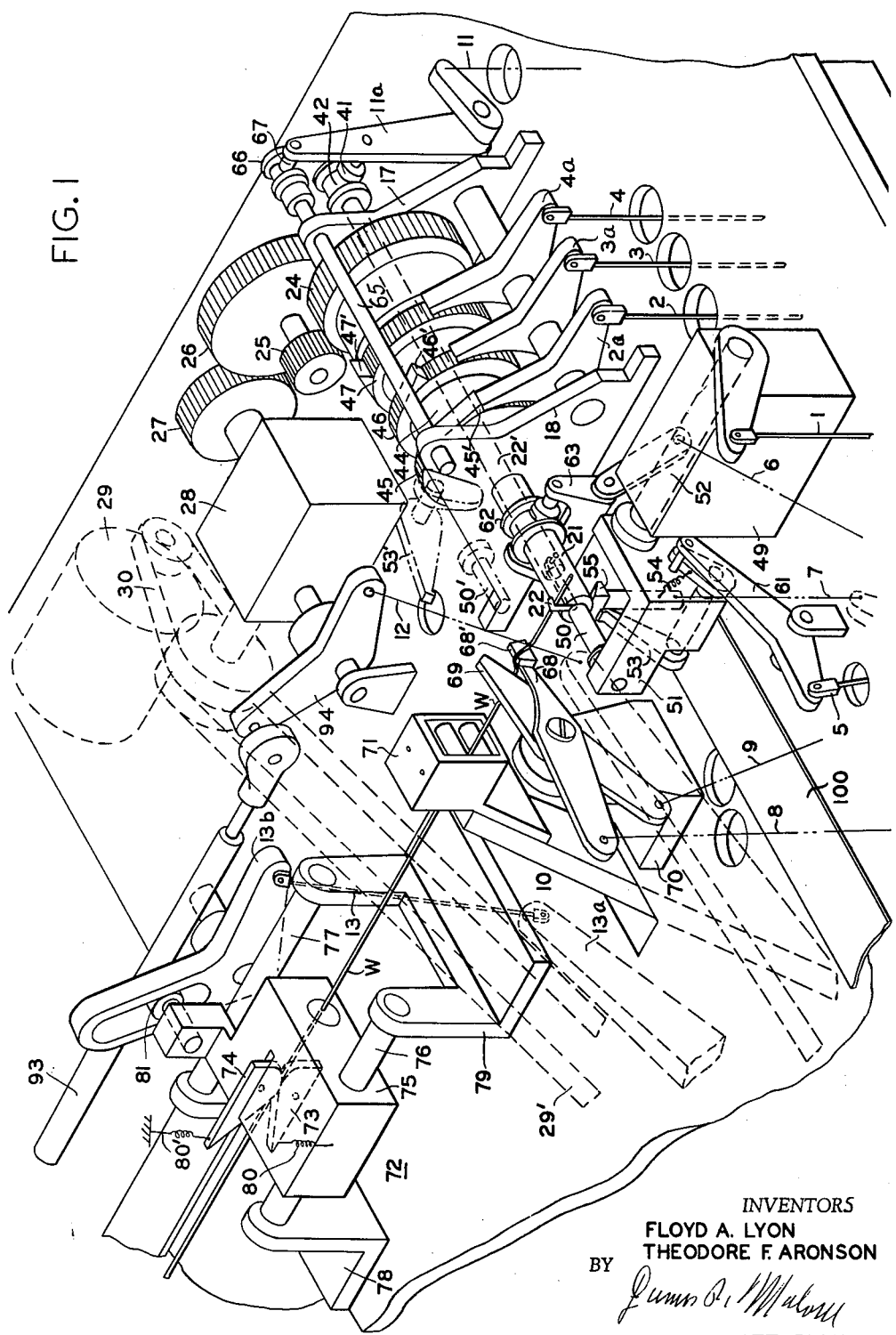

FIGURES 1, 1A and 1B show a perspective view of an embodiment of the invention. The wire W is fed through wire stripping means 40 to the primary mandrel, which distance is accurately adjusted for different coils. The primary mandrel 21 comprises a tube which is connected to the drive gear 24, by means of a clutch as will be described. Gear 24 is connected by means of the gears 25, 26, and 27 to gear box 28 and thence to the motor 29 by means of the belt 30. The clamping hook 22 in the primary mandrel 21 is adapted to be actuated by rod 22' and the cam arm 11 which is connected to the rod 22' by a linkage comprising the stud 41 and spool 42 mounted on rod 22' which is connected to the hook as will be described.

The primary mandrel tube 21 is fixedly connected to a cylindrical member 44 which is rotatably mounted and connected to the drive gear 24 by means of a clutch, FIGURE 2. On the member 44 are fixedly mounted three toothed wheels 45, 46 and 47 having adjustable stops 45', 46', and 47' connected thereto. These stops are adapted to be engaged by the cam-operated arms 2a, 3a, and 4a respectively, in order to stop the mandrel 21 in "start, cut, and bend" positions as will be described. When the machine is operating the motor and transmission drives the gear 24 continuously, and when the mandrel is stopped by any of the stopping cam-operated arms 2a, 3a, and 4a, the clutch slips.

A second mandrel 50 is mounted for rotation on a bracket 51 which is rotatably mounted by means of the shaft 52 mounted in the frame member 49. The shaft 52 is connected at its other end to the cam arm 1. Also rotatably mounted on a shaft in bracket 51 is a bending clamp 53 which is spring loaded against the second mandrel 50 by means of the spring 54. The purpose of the bending clamp 53 is to hold the second coil in position on the mandrel 50 while the coils are being bent relative one another by means of the rotation of the bracket 51 by the cam arm 1. The position of the mandrel 50 after bending is shown by dotted line at 50', and the corresponding position of clamp 53 is shown at 53'.

A lower bending clamp 55 on cam arm 7 is provided for the primary mandrel for the same purpose, namely, to clamp the first coil on the primary mandrel during the bending operation. The bending clamp 53 is released from the spring 54 pressure by means of the linkage comprising the pin 60 and the crank arm 61 connected to the cam arm 5. The bending hook 53 and mandrel 50 are adapted to rotate to the dotted positions 53' and 50' in order to bend the coils into parallel position.

An ejection collar 62 is slidably mounted on the mandrel 21 for the purpose of ejecting the completed coil from the mandrel. The collar 62 may also be used as a positive stop for causing the wire to wind back in a double layer. The collar 62 is formed in the shape of a spool which is moved along the mandrel 21 by means of the rotatably mounted fork 63 which is actuated by the cam arm 6.

In order to release the bending hook 53 in the upper position 53' for the purpose of ejecting the coil, a rod 65 is slidably mounted in the main brackets 17 and 18 and is actuated by means of the spool 66 which engages the pin 67 connected to the cam arm 11a which also operates the clamping hook 22. Rod 65 is adapted to contact finger 53a connected to clamp 53.

The wire is cut before bending by means of the scissor type cutters 68 and 69 which are mounted on the bracket 70 and actuated by the cam arms 8 and 9. The offset block 68' on cutter 68 is used to put a predetermined bend in the wire W. The wire is adapted to be guided along the axis of the mandrels by means of the wire pitch feeder guide 71 which is rotatably mounted on the cam arm 10 to advance the wire progressively along the mandrel. The guide 71 may include a pair of horizontal and a pair of vertical rollers.

After the wire has been cut, the leading edge of the wire for the next coil is fed into engagement with the clamping hook 22 by means of the wire feeding means 72 which comprises a pair of uni-directional clamping fingers 73 and 74 which are pivotally mounted in the block 75 which in turn is mounted on guide bars 76 and 77 which are secured to the main frame by means of the brackets 78 and 79. The clamping members 73 and 74 are spring loaded by means of the springs 80 and 80', and they are of the uni-directional clamping type. In other words when the block 75 is actuated forward by means of the cam-operated rocker arm 13b which is connected to the block 75 by means of the slot and pin leakage 81, then the clamping members 73, 74 due to their pivotal mounting behind the point of common contact with the wire, spring loading, and cam surfaces, squeeze the wire between them and move it forward. However, when the block 75 is moved in the opposite direction, they are released on the wire due to the cam shape and eccentric mounting and slide back freely. The wire feeding means 72 moves the leading end of the wire a predetermined distance from the cutters to the initial winding point, so that the leading edge engages the clamp 22 in order to start the winding of the next coil. The wire feeder 72 is operated by the linkage comprising arms 13, 13a, 13b connected to cam 13.

The wire stripping means 40, FIGURE 1A, is mounted a predetermined distance from the cutting means and is adapted to strip the insulation off the wire for about three-quarters of an inch so that both ends of the coil will be ready for soldering. The wire stripping means generally comprises four cutters 82, 83, 84, and 85 which are pivotally mounted in a disc or wheel 86 driven by motor 86'. The cutters are arranged, as will be described, so that they are pressed against the wire by the action of the spool 87 which is actuated by the pivotally mounted rocker arms 88 and 89 which are rotated by means of the pin 90 in slot 91 of the connecting arm 92. The connecting arm 92 is connected by means of rod 93 and rocker arm 94 to the cam arm 12. The detail mounting of the cutters will be described in connection with FIGURE 3.

The entire stripping apparatus is mounted on an adjustable shelf 95 having a pair of clamping blocks 96 and 97 connected thereto to keep the wire from twisting. Each of the clamping blocks has a wire clamp 96' and 97' which are cam-operated by means of the slot and pin linkages 98 and 99 which connect the clamping members to the actuating rod 92.

A bracket 86c is slidably mounted on two shafts 86d and 86e which are slidably mounted in the clamping block 97. The cutting wheel 86 is rotatably mounted on a hollow shaft 86a which is fixedly mounted on the bracket 86c.

In the stripping operation, the clamps 96' and 97' are operated by the linkages 98, 99 in order to keep the wire from twisting during the stripping of the insulation. Thereafter the linkage 90, 91 and rocker arms 88, 89 connected thereto move the wheel 86 a short distance, for instance, three-quarters of an inch along the wire. At the same time the cutters are pressed down on the wire to strip the insulation as described in connection with FIGURE 3. The shelf 95 is preferably adjustable in position in order to provide different size coils.

FIGURE 2 shows a sectional view generally along the axis of the primary mandrel 21. The whole assembly is mounted on a table frame F. A pair of main bearing brackets 17 and 18, mounted on the frame F, support the large rotatable stop member 44 by means of the bearings 17' and 18'. The member 44 has a generally cylindrical shape with different diameters along its length, and the rotatable mandrel 21 is fixedly connected or keyed to the member 44 along the axis of rotation by key 44'. Clamping hook 22 is pivotally connected to rod 22' by means of the pin 32. The clamping hook 22 is operated in the mandrel 21 tube by means of the pin 21' in the mandrel 21 which extends through an angled slot 31 in the clamping hook. When the rod is drawn back, the hook 22 clamps the wire W on the mandrel as shown, and when the rod 22' is pushed forward, the hook rises and releases the wire.

The stop means 45, 46, and 47 are toothed wheels which are cut into the rotatable member 44. Adjustable stopping blocks 45', 46', and 47' may be clamped at the proper points to the stop wheels 45, 46, and 47. The member 44 and the mandrel 21 are driven by the gear 24, mounted on the bearings 24' and 34', through a clutch comprising a face 33, connected to the member 44, and a face 34, connected to gear 24. Clutch face 34 is spring loaded by the spring 35, and other similar springs (not shown) spaced around the periphery. As previously described, when the machine is in operation, the gear 24 is continuously energized, and when the mandrel is stopped, the clutch 33, 34 slips.

The second mandrel 50 is mounted in the bracket 51 by means of the bearing 51'. When the mandrel 50 is in the position shown in FIGURE 2, that is, coaxial with the mandrel 21, then it is rotatably driven by its contact with the mandrel 21. The clamping hook 53 for the secondary mandrel 50 is also pivotally mounted on the bracket 51 at 53a. The ejection collar 62 is slidably mounted on the mandrel 21 and is actuated along the mandrel by means of the forked cam arm 6 which is pivotally mounted on shaft 6a mounted on the frame. The collar 62 is used to eject the finished coil and also may be used as an adjustable stop for reversing the direction of winding. In other words, the coil starts at the hook 22 and goes back until it meets the stop 62 where it is forced up to start a second layer in the opposite direction. Therefore, the length of the coil can be controlled by the position of the collar 62 which is a function of the shape of the cam 6'.

*Cam arrangements*

All of the cam arms are actuated by cams 1' to 13' mounted on one cam shaft 36, FIGURE 1B, which is driven by motor 29 by means of belt 29'. All of the cams operate rocker arms mounted on the common rocker arm shaft 37. For instance, the cam arm 6, FIGURE 2, is forked at its lower end and connected to rocker arm 6b, the other end of which has a follower which contacts the cam 6'. All the rocker arms are spring loaded to the respective cams.

The lower clamp 55, FIGURE 2, is actuated up and down by the cam-operated arm 7 which is connected by a pin and slot linkage 7d at its lower end to connecting arm 7a which is pivotally mounted at its other end to bracket 7b connected to the frame F. A connecting arm 7c is pivotally connected to the middle portion of arm 7a and it is connected at its other end to the rocker arm 7a which is actuated by the cam 7'.

Also shown on FIGURE 2 are the cutters 68 and 69 which are pivotally mounted on the mounting block 70 and which are actuated by cam arms 8 and 9 as shown in FIGURE 1. The cam arm 11 is pivotally mounted on shaft 11a which is mounted on the bracket 11b connected to the frame. The lower end of arm 11 is connected to connecting rod 11c which is connected at its other end to rocker arm 11d which is actuated by cam 11'. The arm 11 operates the spool 42 which actuates the hook 22, and the arm 11 also operates the spool 66 which operates the rod 65. Cam arms 2, 3, and 4 are pivotally mounted to rocker arms 2a, 3a, and 4a, which are actuated by cams 2', 3', and 4'.

Figure 3:
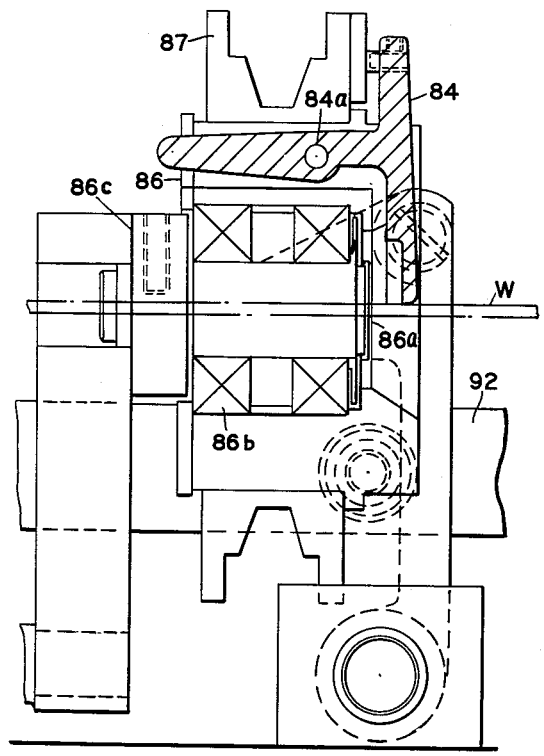
FIGURE 3 is a detail view of the insulation stripping means.
Figure 5:
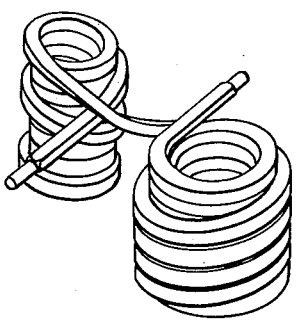
FIGURE 5 is a perspective view of a coil wound by the invention.

FIGURE 3 shows a detail view of the wire stripping means shown generally in FIGURE 1A. There are four cutters as shown in FIGURE 1A which are all mounted like cutter 84 of FIGURE 3, which is pivotally mounted on the driven wheel 86. The wheel 86 is rotatably mounted on hollow shaft 86a by means of bearing 86b, the hollow shaft 86a being mounted on bracket 86c, which is slidably connected to clamp mount 97. Motor 86' drives the cutter wheel by means of belt 86''. The spool 87 slides on the wheel 86, being actuated by the rocker arms 88 and 89 as shown in FIGURE 1A. The cutters are pressed down on the wire by means of the spool 87 rotating them about their respective pivot points.

*Cam operation tabulation*

(1) Cam arm 1 operates secondary mandrel 50 and performs bending.

(2) Cam arm 2 operates stop 45'. This stop is released at the start of the cycle (zero degrees).

(3) Cam arm 3 operates stop 46' to establish the "cut" position.

(4) Cam arm 4 operates stop 47' to establish the "bending" position.

(5) Cam arm 5 operates the hook clamp 53 on the secondary mandrel.

(6) Cam arm 6 operates the ejector collar 62 on the primary mandrel, and is an adjustable stop for winding back of the coil.

(7) Cam arm 7 operates the lower bending clamp 55.

(8) Cam arm 8 operates the lower cutter 68.

(9) Cam arm 9 operates the upper cutter 69.

(10) Cam arm 10 operates the wire pitch feeder 71.

(11) Cam arm 11 operates the clamping hook 22 on the primary mandrel and the release arm 65 for the hook clamp 53.

(12) Cam arm 12 operates the insulation stripping means 40.

(13) Cam arm 13 operates the wire feed 72 which feeds the leading edge of the wire into the hook clamp on mandrel 21.

*Cycle of operation*

Figure 4:
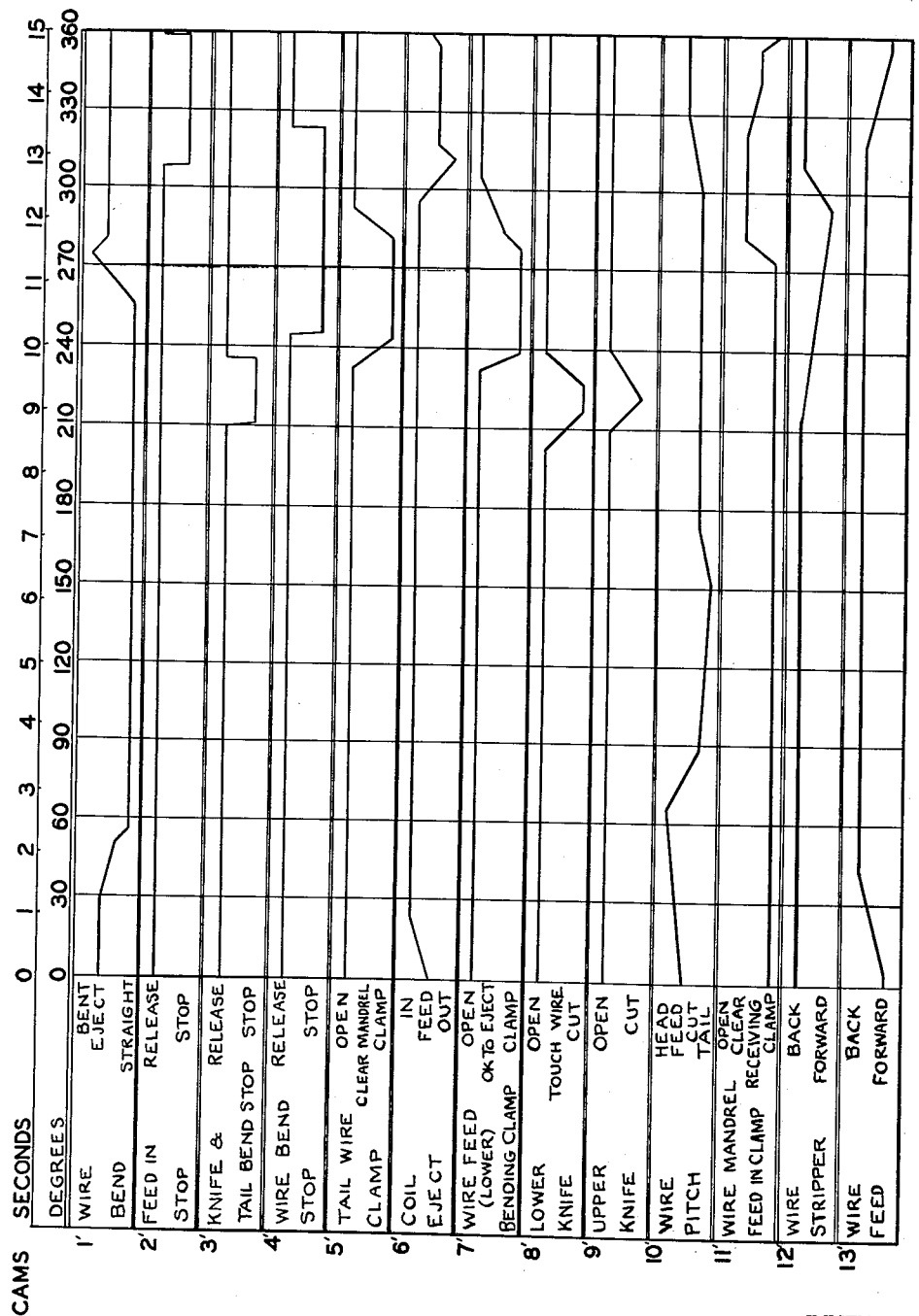
FIGURE 4 is a cam timing and development diagram.

Referring to the cam development and timing diagram, FIGURE 4, in "start" position (0°) on diagram, stop 45' is about to be released by cam 2'. The leading end of the wire W has been fed into the hook 22 by the wire feeder 72 via cam 13', and the hook 22 on the primary mandrel has clamped the wire by action of cam 11' (350°–360°).

When the stop 45' is released by cam 2', the primary mandrel 21 starts winding the first coil. The coil pitch is controlled by wire guide 71 under the control of cam 10'. The primary mandrel drive is continuous but the clutch slips when any of the stops are engaged. The rotatable mandrel 50 then rotates (30°–55°) on chart by means of cam 1' to a straight position coaxial with the primary mandrel 21. The wire feeder 71 then crosses over to the second mandrel under the action of cam 10' (65°–85°), and the second coil is wound (86°–200°), the primary mandrel driving the secondary mandrel. When the second coil is completed, stop 46', actuated by cam 3', stops the rotation of the primary mandrel in "cut" position (210°). In some coils the mandrel may be stopped during the crossover period.

Cams 8' and 9' then operate the cutters 68 and 69 to cut the wire (200°–230°). Stop 46' is released (235°) by cam 3' and the primary mandrel then rotates until stopped by stop 47', which is actuated by cam 4' in "bend" position (250°). This step may not be necessary if the wire is in good bending position at the "cut" position. It depends upon the particular coil.

During this time the bending hook 53 on the rotatable mandrel clamps the second coil by means of spring 54 and is released by cam 5' and rocker arm 61 releasing the spring 54. The lower clamp 55 rises and clamps the lower coil under the action of cam 7' (245°–255°).

The rotatable mandrel 50 is then rotated up by cam 1' (255°–275°) to bend the coils past parallel position. There is some overbending as the wire tends to spring back, and then the mandrel 50 drops back to position 50', FIGURE 1 (275°–280°), leaving the coils in parallel position. The lower clamp 55 is then released (280°), and the arm 65 is then moved forward by cam 11' to release the bending hook 53' on the rotatable mandrel.

The ejector collar 62 is then moved forward by cam 6' (290°–320°), and the double coil is ejected onto the takeaway belt 100. Stop 47 is then released (320°) and the primary mandrel rotates until stopped by stop 45' in the "start" position.

The leading end of the next length of wire is then fed into the hook 22 on the primary mandrel by cam arm 13 and wire feeder 72 (280°–340°), and the apparatus is ready for another cycle.

All the cams may be cut using the cam chart of FIGURE 4. Each cam diagram represents the developed circumference of its cam. Different coils may require adjustments of the timing cycle.

Figure 6:
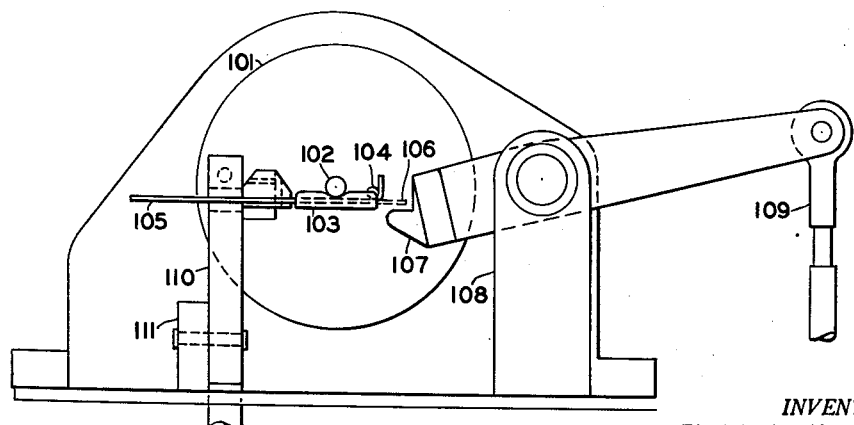
FIGURE 6 is an elevation view of a modification of the invention.

FIGURE 6 shows a modification of the invention for winding a coil with a predetermined length bent lead. In this embodiment a rotatable face plate 101 is fixedly connected to the mandrel 102. A guide 103 for the wire is mounted on the face plate directly underneath the mandrel, and a bending pin 104 is mounted on the face plate 101 at a predetermined distance from the mandrel. This distance is chosen to provide the desired length lead for the coil. The wire 105 is fed between the guide 103 and the mandrel 102 by the wire feeder as previously described so that the end of the wire extends to the point 106 shown by the dotted lines. The end of the wire is then bent around the pin 104 by the cam-operated arm 107. The arm 107 is pivotally mounted on bracket 108 connected to the main frame and is actuated by connecting arm 109 which is connected at its other end to a cam, not shown, on the cam shaft in the same manner as previously described. The arm 110 is a pitch guide pivotally mounted on bracket 111 and adapted to be cam-operated.

The operation of the modification of FIGURE 6 is as follows: The wire is fed into the point 106. The cam arm 107 is then rotated clockwise thereby bending the end of the wire around the pin 104 to the position shown. The coil is then wound by rotating the mandrel and face plate in the same manner as previously described. This modification dispenses with the clamping hook inside the mandrel since the guide 103 and pin 104 hold the wire on the mandrel for the initial turns. This modification provides a finished coil with a lead of predetermined length having a predetermined bend in it. The coil may be ejected by retracting the mandrel by cam-operated means.

We claim:

1. Coil winding means for winding parallel connected coils from a single straight length of wire, comprising a first driven mandrel for winding a first coil, a second mandrel rotatably mounted about an axis perpendicular to and offset from said first mandrel axis and adapted to be moved into coaxial relation to said first mandrel to wind a second coil continuous with said first coil from said straight wire, means to then rotate said offset second mandrel parallel to said first mandrel to bend said first and second coils into predetermined parallel space relation, whereby said first and second coils are made parallel and spaced a predetermined amount, and means to eject said continuous parallel coils from said first and parallel second mandrels.

2. Coil winding means for winding a series of parallel connected coils from a single straight length of wire, comprising a first driven mandrel for winding a first coil, a second mandrel rotatably mounted about an axis perpendicular to and offset from said first mandrel axis mounted and adapted to be moved in coaxial relation to said first mandrel to wind a second coil continuous with said first coil from said straight wire, means to cut said straight wire, means to then rotate said first mandrel to a predetermined bending position, means to rotate said offset second mandrel relative said first mandrel to then bend said first and second coils into predetermined parallel space relation, whereby said first and second coils are made parallel and spaced a predetermined amount, means to eject said continuous parallel coils from said first and second mandrels, means to feed the leading end of said straight wire into engagement with said first mandrel, and a hook clamp in said first mandrel to clamp said leading end whereby successive identical parallel coils may be wound.

3. Coil winding means comprising a first driven mandrel for winding a first coil, means to clamp a wire to said first mandrel comprising a cam operated hook connected inside said first mandrel, a driven cam connected to operate said hook, a second mandrel rotatably mounted about an axis offset from the axis of said first mandrel and adapted to be moved into coaxial relation with said first mandrel to wind a second coil continuous with said first coil, a first bending clamp connected to clamp said first coil to said first mandrel, a second bending clamp connected to clamp said second coil to said second mandrel, and means to rotate said second mandrel to bend said first and second coils into predetermined space relation.

References Cited in the file of this patent
UNITED STATES PATENTS

| | | |
|---|---|---|
| 1,731,183 | Thacker | Oct. 8, 1929 |
| 1,828,413 | Holmes | Oct. 20, 1931 |
| 2,276,579 | Halvorsen et al. | Mar. 17, 1942 |
| 2,453,749 | Hilsinger | Nov. 16, 1948 |
| 2,589,503 | McCullough | Mar. 18, 1952 |
| 2,693,204 | Greiner et al. | Nov. 2, 1954 |
| 2,754,580 | Schlaich | July 17, 1956 |
| 2,843,159 | Bonde et al. | July 15, 1958 |
| 2,856,969 | Waful | Oct. 21, 1958 |